US006909831B2

(12) United States Patent
Haase et al.

(10) Patent No.: US 6,909,831 B2
(45) Date of Patent: *Jun. 21, 2005

(54) OPTICAL WAVEGUIDE

(75) Inventors: Michael Albert Haase, St. Paul, MN (US); Jun-Ying Zhang, Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/833,555

(22) Filed: Apr. 28, 2004

(65) Prior Publication Data

US 2004/0197065 A1 Oct. 7, 2004

Related U.S. Application Data

(63) Continuation of application No. 10/177,102, filed on Jun. 21, 2002, now Pat. No. 6,832,034.

(51) Int. Cl.⁷ .................................................. G02B 6/10
(52) U.S. Cl. ..................................................... 385/131
(58) Field of Search .............................. 385/14, 27, 28, 385/129–132

(56) References Cited

U.S. PATENT DOCUMENTS

| 4,923,264 A | 5/1990 | Langer et al. |
| 5,598,501 A | 1/1997 | Maruo et al. |
| 5,613,995 A | 3/1997 | Bhandarkar et al. |
| 5,724,461 A | 3/1998 | Bruno et al. |
| 5,963,573 A | 10/1999 | Haase et al. |
| 6,226,310 B1 | 5/2001 | Takagi et al. |
| 6,312,581 B1 | 11/2001 | Bruce et al. |
| 6,510,276 B1 | 1/2003 | Jain et al. |
| 6,519,380 B2 | 2/2003 | Dawes et al. |
| 6,563,998 B1 | 5/2003 | Farah et al. |
| 6,580,850 B1 | 6/2003 | Kazarinov et al. |
| 6,600,864 B2 | 7/2003 | Samara-Rubio et al. |
| 2002/0076188 A1 | 6/2002 | Kimerling et al. |
| 2002/0118907 A1 | 8/2002 | Sugama et al. |
| 2002/0158853 A1 | 10/2002 | Sugawara et al. |
| 2003/0007535 A1 | 1/2003 | Haase et al. |

FOREIGN PATENT DOCUMENTS

WO    WO 02/42808 A2    5/2002

OTHER PUBLICATIONS

Germann et al., "Silicon Oxynitride Layers for Optical Waveguide Applications," *Journal of the Electrochemical Society*, 147 (6), (2000), pp. 2237–2241.
Tamir (Ed.), *Guided–Wave Optoelectronics*, Second Edition, Springer–Verlag, (1990), pp. IX–XIV and 42–51.
Yang et al., "Theoretical investigation on quantum well lasers with extremely low vertical beam divergence and low threshold current", *Journal of Applied Physics*, vol. 83, No. 1, pp. 8–14, XP002253347, ISSN: 0021–8979(97)06824–2 (Jan. 1, 1998), pp. 8–14.

*Primary Examiner*—Edward J. Glick
*Assistant Examiner*—Thomas R Artman
(74) *Attorney, Agent, or Firm*—Douglas B. Little; Melanie G. Gover

(57) ABSTRACT

Disclosed is an optical waveguide having an optical confinement layer.

16 Claims, 2 Drawing Sheets

OPTICAL WAVEGUIDE

PRIORITY INFORMATION

This application is a continuation of application Ser. No. 10/177,102 filed Jun. 21, 2002, now U.S. Pat. No. 6,832,034.

TECHNICAL FIELD

This invention relates to planar optical waveguides and a method of making the waveguides.

BACKGROUND

Optical fiber communication systems are becoming prevalent. The optical fiber system can comprise an optical fiber, and a wide variety of other optical devices for receiving, transmitting, and using signals. Optical waveguides, which provide a means of receiving and processing signals from optical fibers, have proven to be useful devices in optical fiber systems.

SUMMARY OF INVENTION

The present invention features a novel optical waveguide comprising an optical confinement layer. The waveguide has a lower cladding layer, a core layer, a patterned optical confinement layer proximate to the core layer, an optional upper cladding layer, and an optional substrate. The optical confinement layer may comprise, e.g., $MgF_2$, LiF, or any other low index material. The core layer may comprise a high index silica doped with, e.g., aluminum, titanium, tantalum, zirconium, germanium, hafnium, or phosphorus. Alternatively, the core layer may comprise silicon oxynitride (SiON) or silicon nitride ($Si_3N_4$). The cladding layers may comprise silica. For example, the lower cladding layer may comprise a low index silica that may be doped with boron or fluorine. The substrate may comprise silicon or silica. Alternatively, the cladding layers and core layer may each comprise a polymer. In some embodiments, the waveguide may include layers doped with rare earth elements, such as erbium.

The location of the optical confinement layer may vary as long as it is proximate to the core layer. For example, the optical confinement layer can be between the lower cladding layer and core layer, between the upper cladding layer and core layer, embedded in the core layer, embedded in the upper cladding layer, or embedded in the lower cladding layer.

As used in this invention: "optical confinement layer" means a layer in an optical waveguide device, distinct from the core layer and the cladding layer, having a refractive index lower than that of the cladding layer, and patterned so as to laterally guide light in the waveguide; and "lateral" directions refer to directions in the plane of the optical confinement layer.

An advantage of at least one embodiment of the present invention is ease of manufacture. In some embodiments, this invention allows fabrication of waveguides using simple photolithography and lift-off patterning techniques, eliminating the need for reactive ion etching (and the associated equipment costs), and minimizing the number of processing steps required.

Another advantage of at least one embodiment of the present invention is low optical loss. In some embodiments, this invention uses very thin layers for lateral optical confinement layers. Because of the thinness of these layers, they may be patterned smoothly and precisely using lift-off or etching techniques, thereby minimizing optical losses due to scattering.

Another advantage of at least one embodiment of the present invention is that the resultant device can have a substantially planar surface, which can be useful for applications in which that surface is to be bonded to a submount. Such applications include those in which the waveguide is to be aligned with another device.

Other features and advantages of the invention will be apparent from the following drawings, detailed description, and claims.

DETAILED DESCRIPTION

Figure 1:
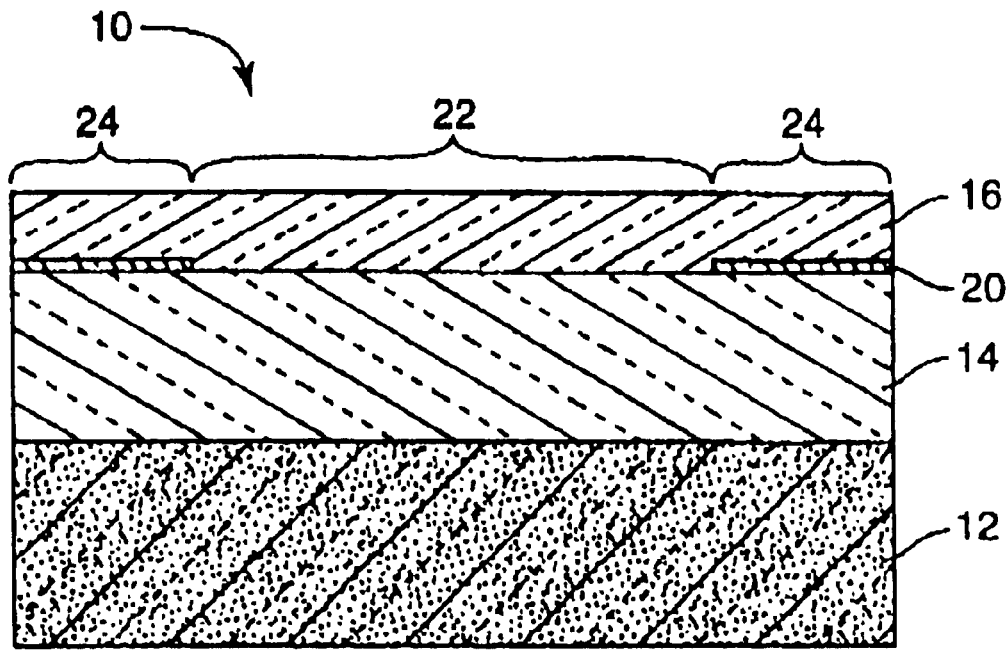
FIG. 1 depicts a waveguide of the present invention having the optical confinement layer between the core layer and lower cladding layer.

Optical waveguides typically consist of a substrate layer, a lower cladding layer, a core layer, and, optionally, an upper cladding layer. They may also comprise a substrate. The present invention provides an optical waveguide having a patterned optical confinement layer proximate to the core layer. The present invention may be realized with a number of different materials systems, including silica glasses. Construction of the various layers of the waveguide can be accomplished by known techniques appropriate for the specific materials. These techniques include chemical vapor deposition (for example, atmospheric pressure chemical vapor deposition, low pressure chemical vapor deposition, plasma enhanced chemical vapor deposition, or metal-organic chemical vapor deposition), sputtering, vacuum evaporation, oxidation, spin-coating (including sol-gel techniques), flame hydrolysis deposition, and other techniques. FIG. 1 depicts an optical waveguide 10 of the present invention.

The substrate 12 is preferably a semiconductor, such as monocrystalline silicon, and it preferably has two substantially planar major surfaces, at least one of which is preferably optically smooth, Alternatively, the substrate may be ceramic or glass. If desired, the substrate could be removed, by etching, after the waveguide is built.

The lower cladding layer 14 is applied onto the substrate by any technique appropriate for the specific material used. The lower cladding may comprise, for example, undoped or doped silica, and may be formed, for example, by plasma-enhanced chemical vapor deposition (PECVD), or in the case of a silicon substrate, by thermal oxidation of the substrate. The lower cladding layer typically isolates the fundamental optical mode from the substrate. Of course, the lower cladding layer preferably exhibits low absorption and low scattering of light at the wavelengths of interest. In principle, if the substrate has the required optical characteristics, the substrate itself may serve as the lower cladding layer.

The core layer 16 is applied onto the lower cladding layer by any technique appropriate for the specific material used. Useful core materials for waveguides have an index of refraction that is higher than that of the lower cladding layer.

For example, in the case of a Si substrate and undoped silica lower cladding, the core material may be silicon oxynitride (see, for example, "Silicon Oxynitride Layers for Optical Waveguide Applications," R. Germann et al., *Journal of the Electrochemical Society*, 147 (6), pp. 2237–2241 (200)), silicon nitride, or other high index doped silica glasses (e.g., silica doped with Al, Ge, P, Ti, Ta, Hf, or Zr).

Figure 2:
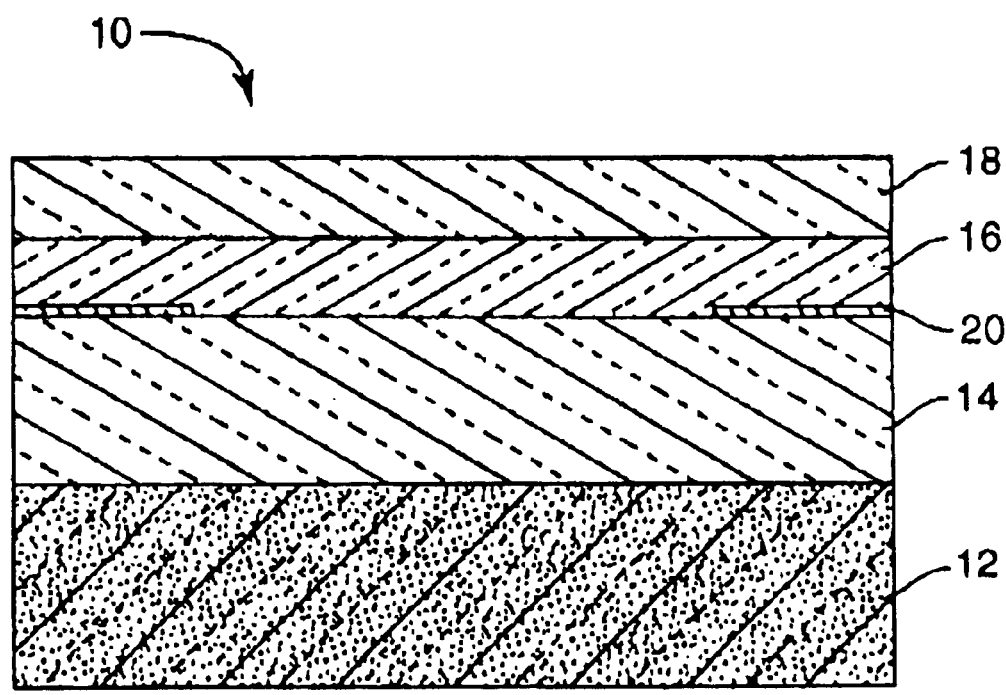
FIG. 2 depicts the waveguide of FIG. 1 with an optional upper cladding layer.

As illustrated by FIG. 2, in some embodiments, an upper cladding layer 18 may be formed onto the core layer. The upper cladding layer should have an index of refraction lower than that of the core layer. The upper cladding layer may be conveniently made of the same material as the lower cladding layer (although other materials with appropriate optical properties may be used).

Figure 3:
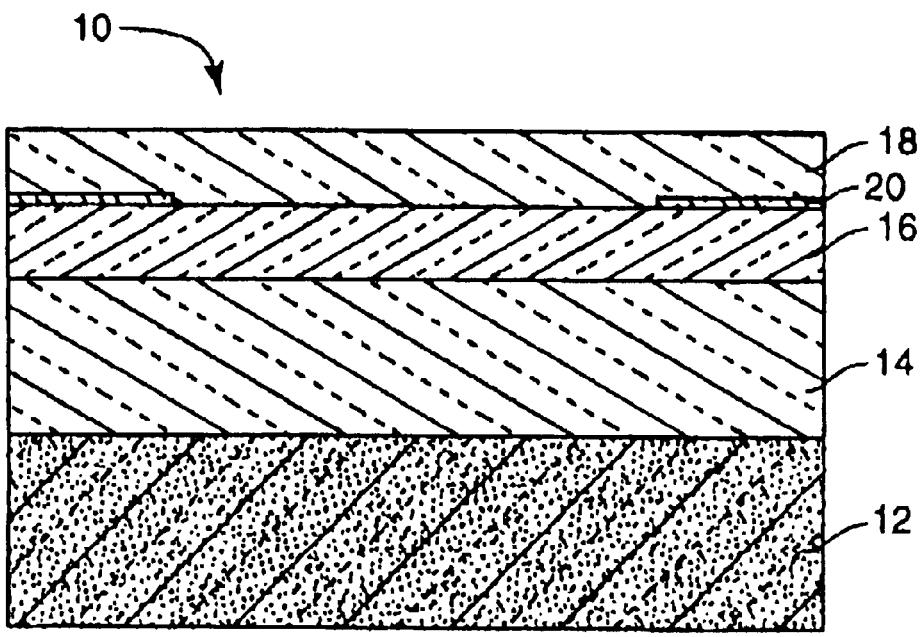
FIG. 3 depicts a waveguide of the present invention having the optical confinement layer between the core layer and upper cladding layer.
Figure 4:
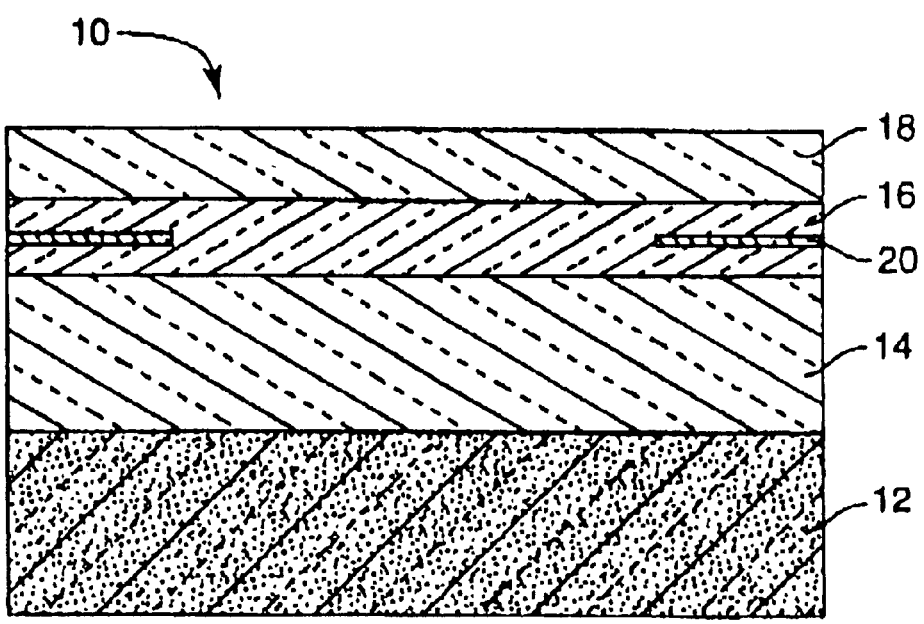
FIG. 4 depicts a waveguide of the present invention having the optical confinement layer embedded in the core layer.

Pursuant to the present invention, a patterned optical confinement layer 20 is formed proximate to the core layer. In general, the optical confinement layer is located within the optical mode of the waveguide. Therefore, the optical confinement layer may be located between the core layer and lower cladding layer, as shown in FIGS. 1 and 2, between the core layer and the upper cladding layer, as shown in FIG. 3, within the core layer, as shown in FIG. 4, or even within the upper or lower cladding layer (not shown) so long as it is within the evanescent tail of the optical mode.

The optical confinement layer may comprise any patternable material with sufficiently low refractive index, including $MgF_2$, LiF, or any other low index material such as low index doped silica (for example, silica doped with boron or fluorine). Preferably, it comprises $MgF_2$, and has a thickness greater than 10 nm and less than 500 nm. The optical confinement layer may be patterned by standard photolithography methods, using either lift-off or etching techniques. In some embodiments in which the optical confinement layer is designed to be a very thin layer (e.g., less that 100 mn) of a material that may be vacuum deposited (e.g., $MgF_2$) the lift-off technique is particularly convenient for forming high-resolution patterns. Alternatively, etching techniques include, but are not limited to wet chemical etching, reactive ion etching, and ion beam etching. The pattern of the optical confinement layer can define the waveguide for a variety of optical devices, e.g., straight waveguides, curved or tapered waveguides, couplers, Mach-Zehnder devices, and optical amplifiers.

Appropriate compositions and thicknesses of the core layer, lower cladding layer, upper cladding layer, and optical confinement layer are designed through numerical modeling. One well-known waveguide modeling technique is the "transfer-matrix" approach (see, for example, Guided-Wave Optoelectronics, Theodor tamir (Ed.), 2nd Edition, Springer-Verlag). Alternatively, commercial waveguide modeling tools may be used, including OptiBPM, from OptiWave Corporation, Ottawa, ON, Canada.

The effectiveness of an optical confinement layer in defining the lateral extent of the waveguide may be understood in terms of an "effective index" model. In the regions where the optical confinement layer exists, the effective index of the slab mode is lowered, compared to regions where there is no confinement layer. Therefore, as illustrated in FIG. 1, a lateral waveguide is formed, with the lateral "core" 22 being the region not having the confinement layer and the lateral "cladding" 24 being the region in which the confinement layer is located.

The choice of materials used for the substrate and various layers of the waveguide depends largely on the wavelength range of the light to be guided and the ultimate application. In addition to the materials already mentioned, a wide range of materials may be used, including, but not limited to polymers, polycrystalline materials, and non-silica glasses (for example, bismuth oxide, zirconia, chalcogenide glasses and fluoride glasses). It is also possible to make a waveguide in which the lower cladding layer, core layer, and, if present, the upper cladding layer each comprise a polymer.

The optical waveguides of the present invention are suitable for use as planar waveguides, Wavelength Add-Drop (WAD) for Dense Wavelength Division Multiplexing (DWDM) systems, Er-doped optical amplifier systems, Mach-Zehnder (MZ) based switches, tunable filters, Y-branch switches, and optical amplifiers.

This invention may be illustrated by way of the following example.

EXAMPLE

Silicon Oxynitride Waveguide

In this example, the tapered waveguide was formed by starting with a (100) silicon wafer, polished on both sides. An oxide was grown on the top surface of the wafer to a thickness of at least 3 $\mu$m, forming the lower cladding. Using standard techniques, photoresist (NR7-1000PY, available from Futurrex, Inc., Franklin, N.J.) was patterned on the lower cladding, defining the desired waveguide pattern. In this example, the straight waveguide was 7.5 $\mu$m wide. The wafer was placed in a vacuum deposition system, and a thin layer of $MgF_2$ (the optical confinement layer) was deposited by electron-beam evaporation (alternatively, other deposition techniques would work, including thermal evaporation, or sputtering). After being removed from the deposition system, the photoresist was removed in acetone (other appropriate solvents could be used), thereby patterning the $MgF_2$ by lift-off. In this example, the $MgF_2$ was 37.5 nm thick. Next, the wafer was placed in a plasma-enhanced chemical vapor deposition (PECVD) system. The silicon oxynitride core was deposited, followed by the silica upper cladding. In this example, the core had a thickness of 0.4 $\mu$m and the nitrogen content in the core was adjusted by controlling the PECVD gas flows to provide a refractive index of 1.668 at the design wavelength of 1480 nm. The upper cladding had a thickness of 1.64 $\mu$m. The resulting waveguide structure provided a very nearly planar surface (suitable for bonding to a submount) and supported a single transverse mode at the design wavelength of 1480 nm.

The waveguide absorption loss could be minimized by a final high-temperature (e.g., 1140° C.) anneal to reduce hydrogen in the PECVD layers.

Various modifications and alterations of this invention will become apparent to those skilled in the art without departing from the scope and spirit of this invention and it should be understood that this invention is not to be unduly limited to the illustrative embodiments set forth herein.

What is claimed is:

1. An optical waveguide comprising:
   a cladding layer,
   a core layer, and
   a patterned optical confinement layer distinct from and between the core layer and cladding layer, having a thickness of greater than 10 nm and less than 500 nm, and having a refractive index lower than that of the cladding layer.

2. The optical waveguide of claim 1 comprising a cladding layer and an upper cladding layer.

3. The optical waveguide of claim 2 wherein both cladding layers comprise silica.

4. The optical waveguide of claim 2 wherein the lower cladding layer, upper cladding layer, and core layer each comprise a polymer.

5. The optical waveguide of claim 2 wherein the optical confinement layer is between the upper cladding layer and core layer.

6. The optical waveguide of claim 1 wherein the optical confinement layer comprises $MgF_2$.

7. The optical waveguide of claim 1 wherein the optical confinement layer comprises LiF.

8. The optical waveguide of claim 1 wherein the optical confinement layer comprises a low index doped silica.

9. The optical waveguide of claim 5 wherein the silica is doped with boron or fluorine.

10. The optical waveguide of claim 1 wherein the core layer comprises a high index doped silica doped with a material selected from the group consisting of aluminum, titanium, tantalum, zirconium, germanium, hafnium, and phosphorus.

11. The optical waveguide of claim 1 wherein the core layer comprises silicon oxynitride or silicon nitride.

12. The optical waveguide of claim 1 wherein the lower cladding layer and core layer each comprise a polymer.

13. The optical waveguide of claim 1 further comprising a substrate.

14. The optical waveguide of claim 13 wherein the substrate layer comprises silicon.

15. The optical waveguide of claim 1 wherein the core layer is doped with a rare earth element.

16. An optical waveguide comprising:

a cladding layer, a core layer, and a patterned optical confinement layer distinct from the core layer and cladding layer, having a thickness of greater than 10 nm and less than 500 nm, and having a refractive index lower than that of the cladding layer, wherein the optical confinement layer is embedded in the cladding layer.

* * * * *